D. D. McBEAN.
TUNNEL CONSTRUCTION.
APPLICATION FILED FEB. 21, 1916.
1,260,416.
Patented Mar. 26, 1918.
6 SHEETS—SHEET 1.
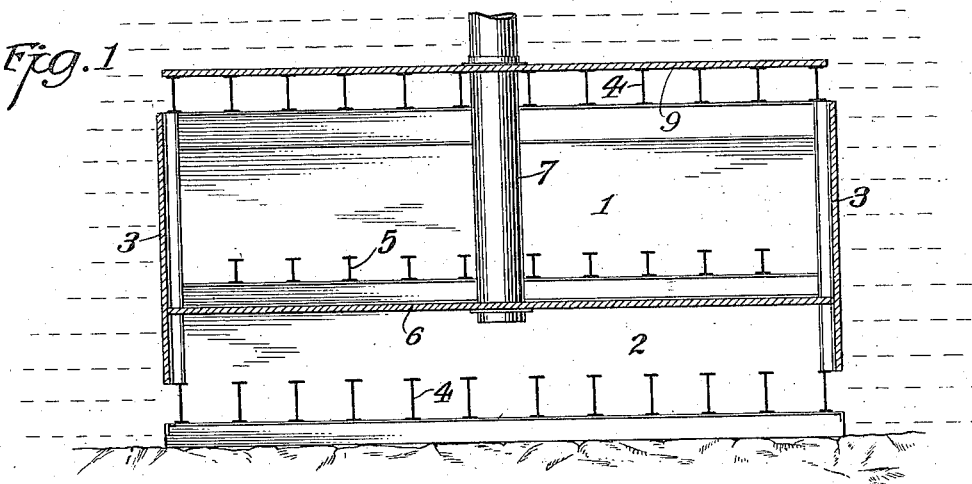
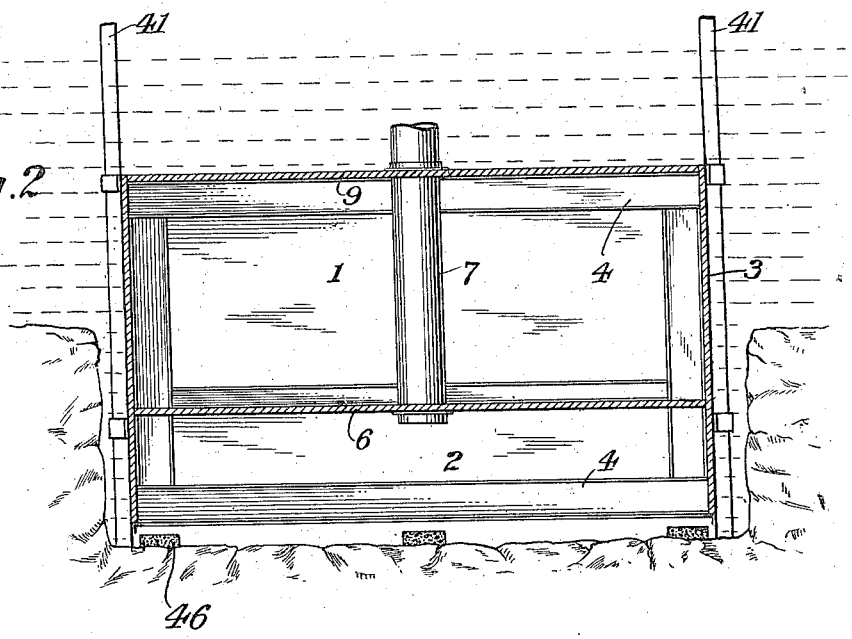
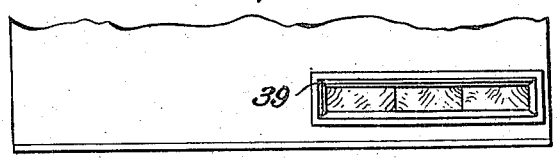
Duncan D. McBean,
Inventor.
By his Attorneys, Kerr, Page, Cooper & Hayward

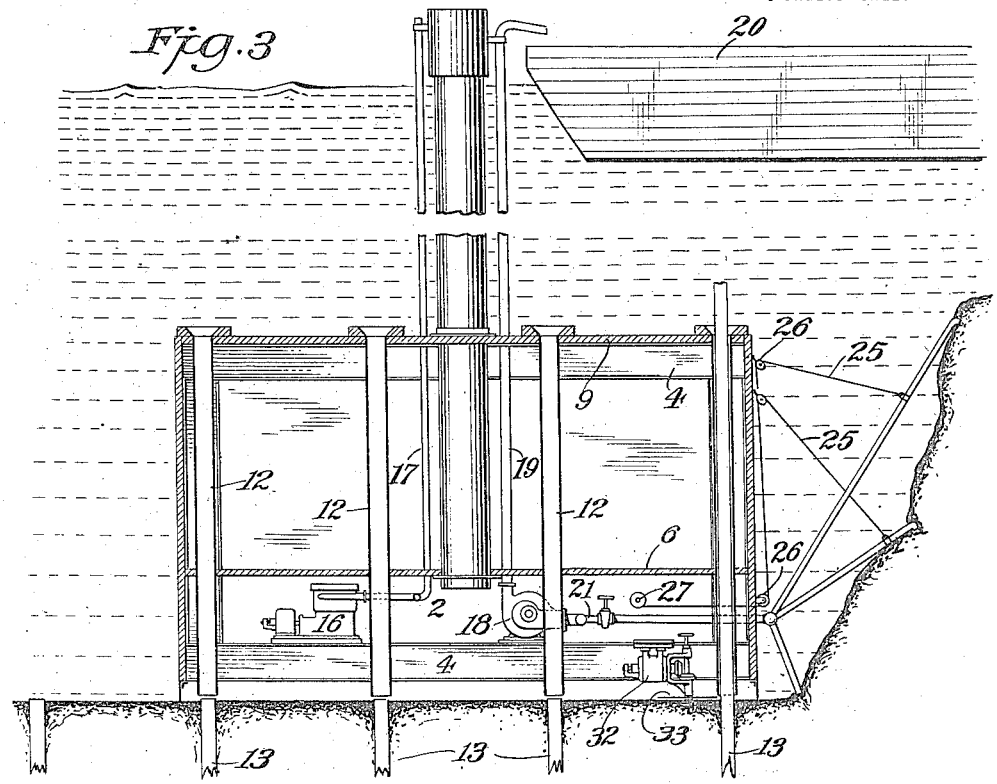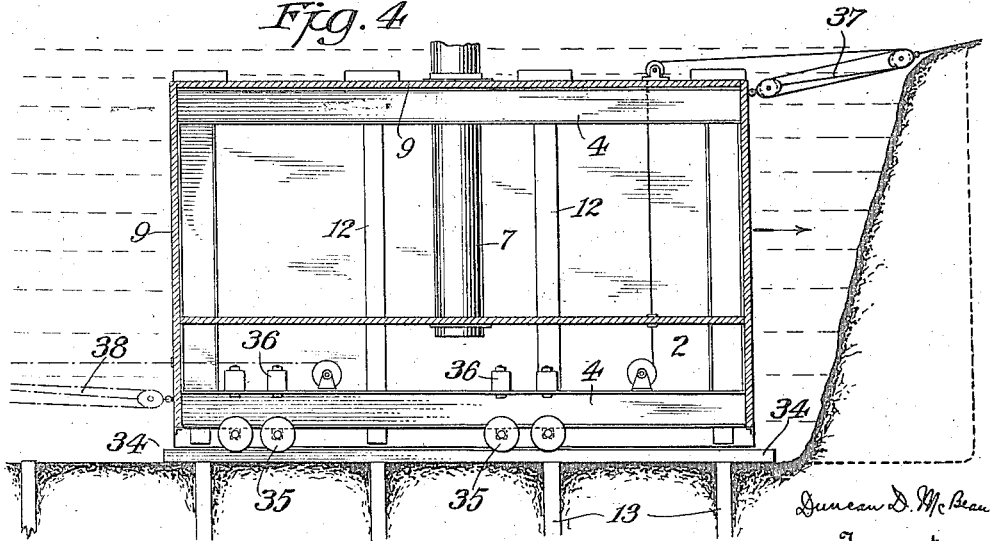

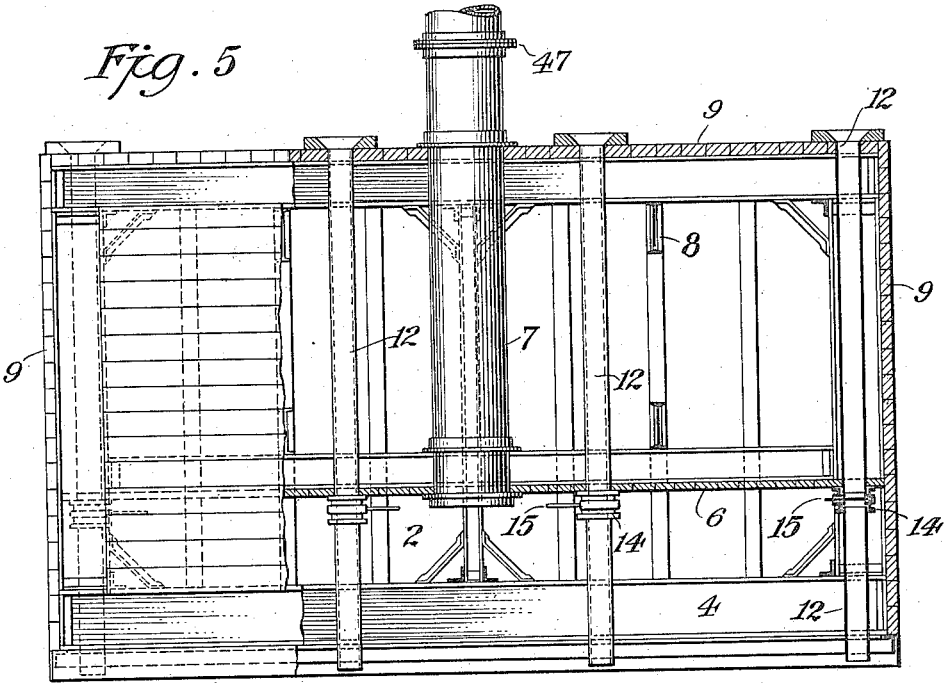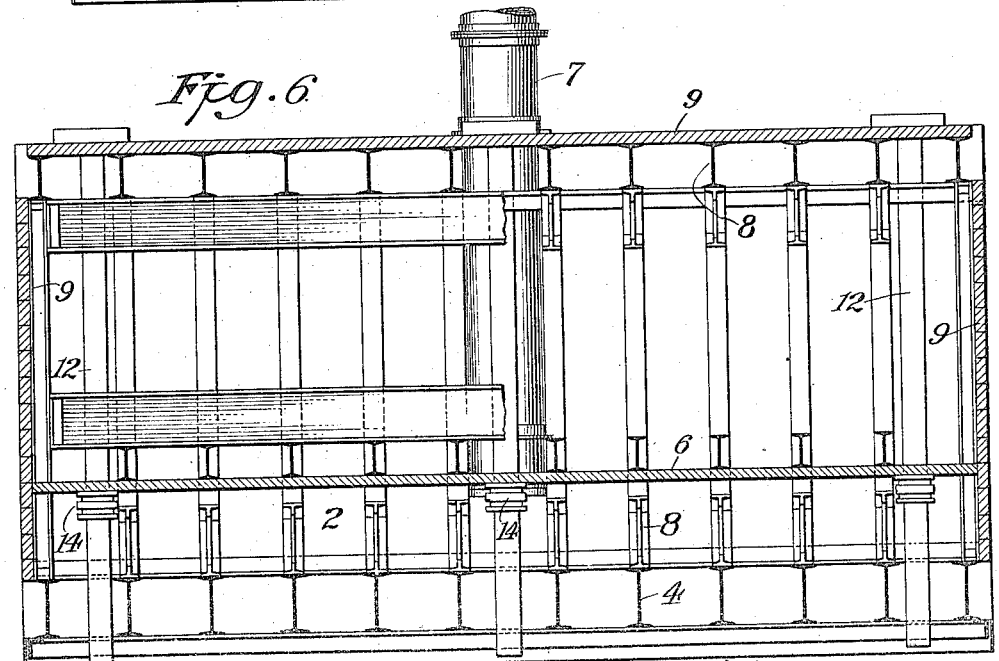

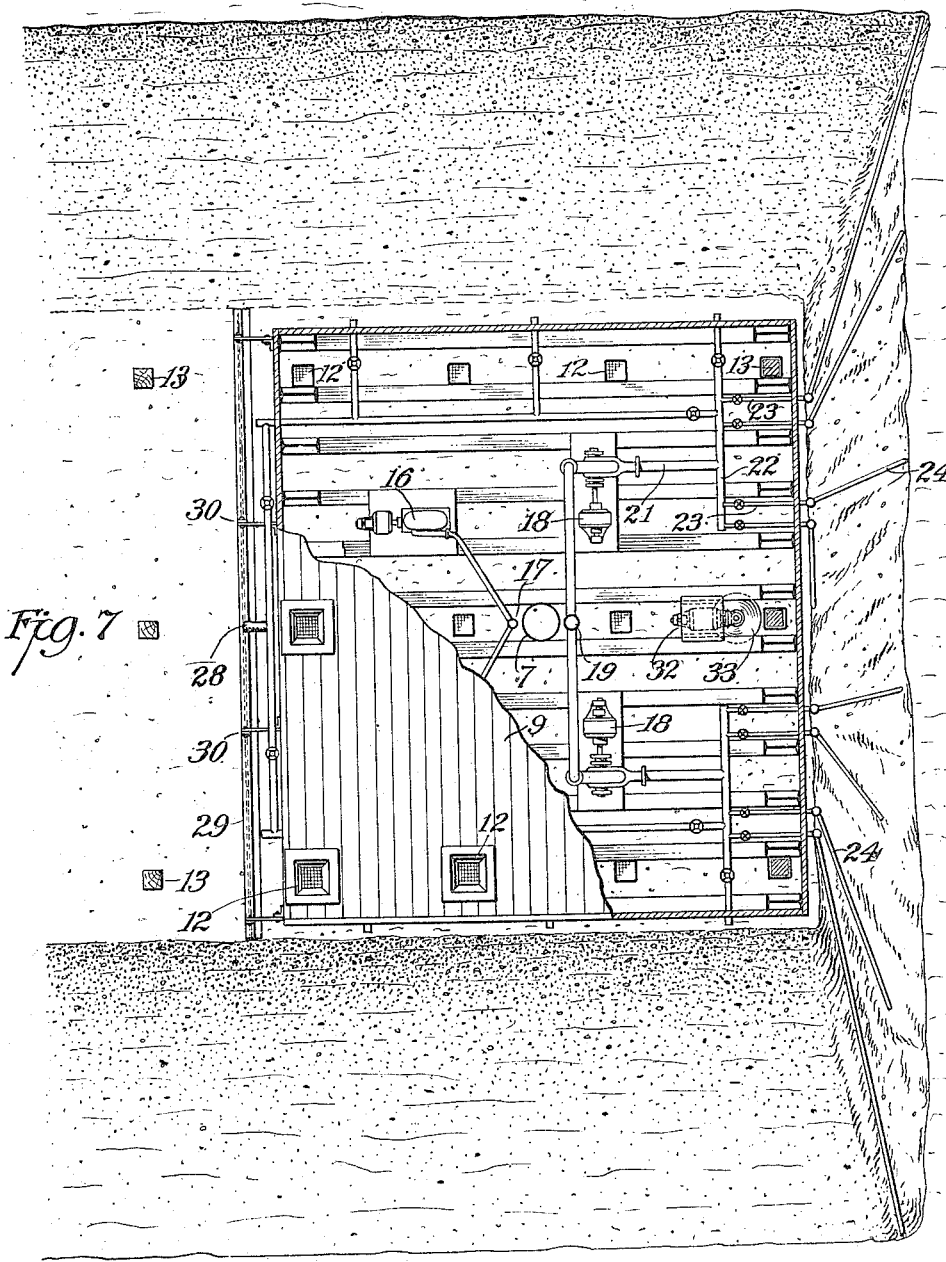
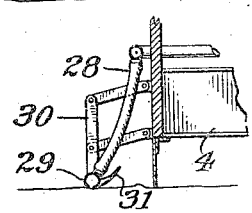

D. D. McBEAN.
TUNNEL CONSTRUCTION.
APPLICATION FILED FEB. 21, 1916.
1,260,416.
Patented Mar. 26, 1918.
6 SHEETS—SHEET 5.
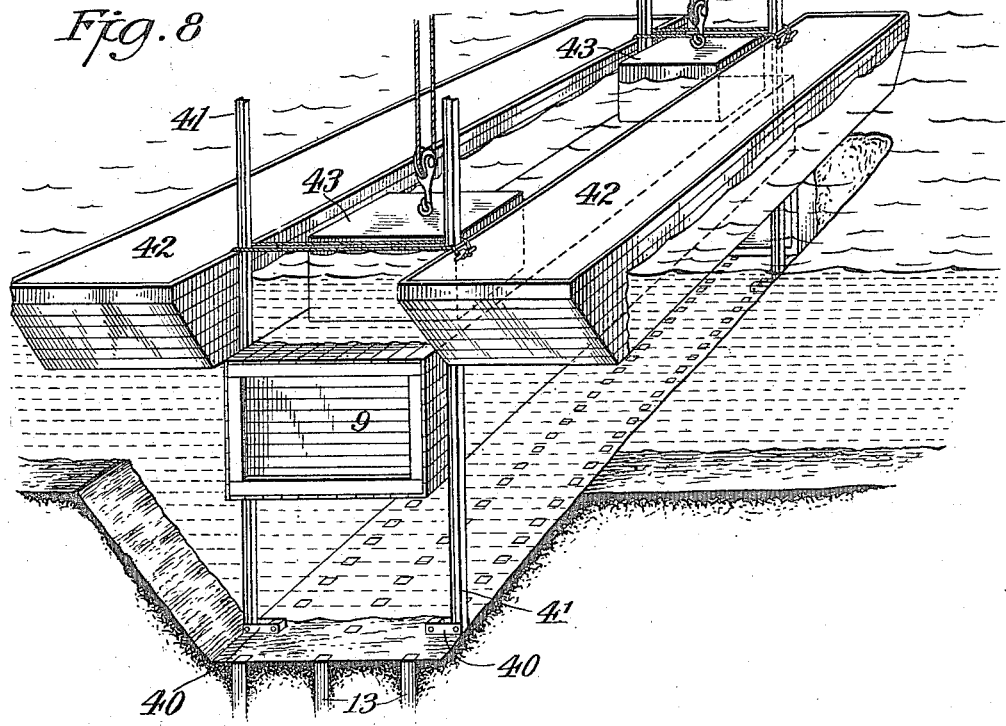
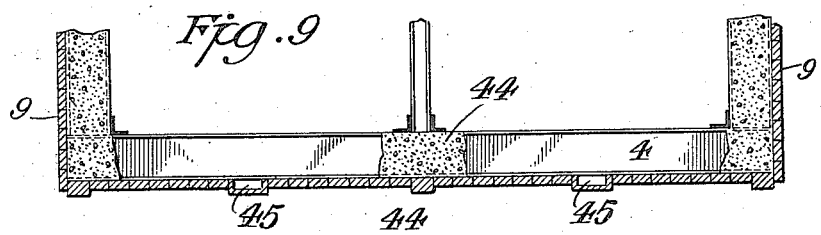
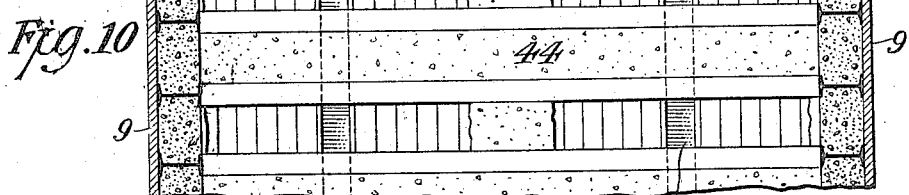
Duncan D. McBean, Inventor.
By his Attorneys, Kerr, Page, Cooper & Hayward.

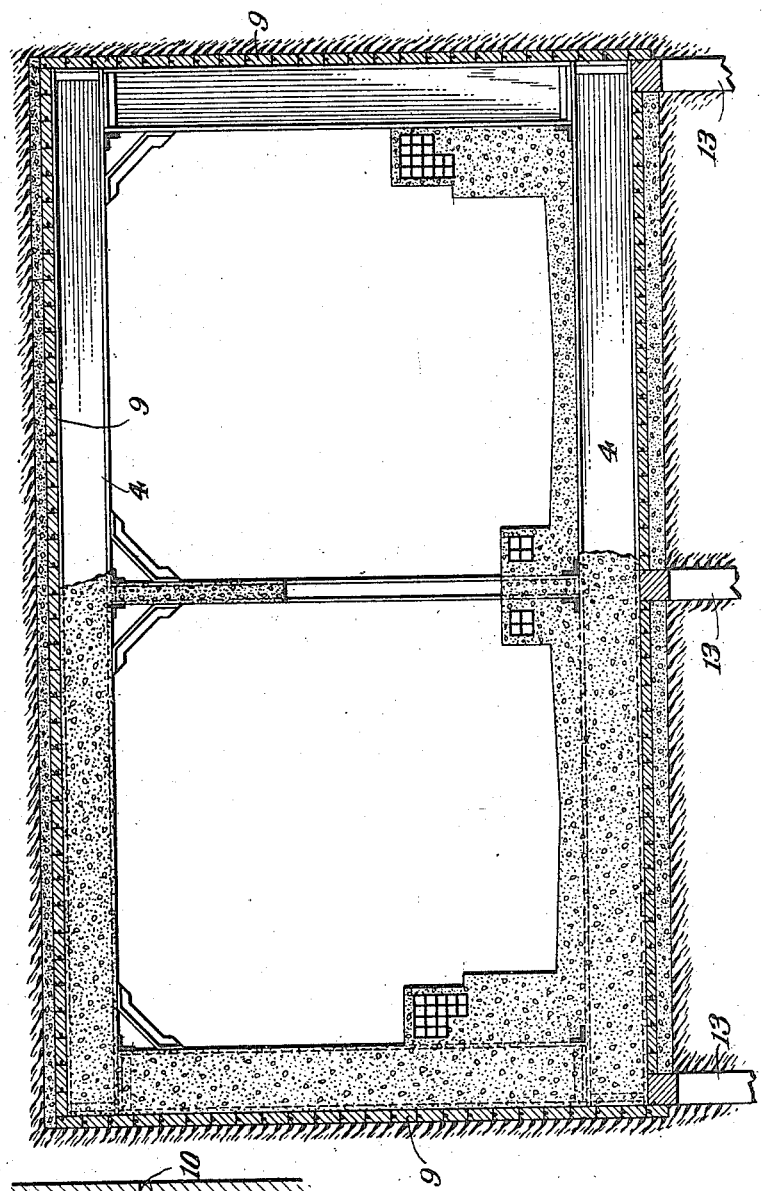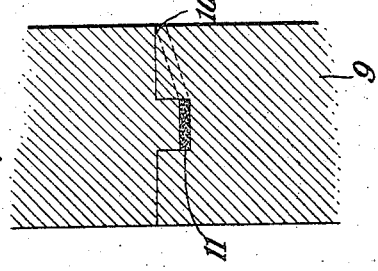

UNITED STATES PATENT OFFICE.

DUNCAN D. McBEAN, OF NEW YORK, N. Y.

TUNNEL CONSTRUCTION.

1,260,416.

Specification of Letters Patent.  Patented Mar. 26, 1918.

Application filed February 21, 1916. Serial No. 79,594.

*To all whom it may concern:*

Be it known that I, DUNCAN D. McBEAN, a citizen of the United States, residing at New York, in the county and State of New York, have invented certain new and useful Improvements in Tunnel Constructions, of which the following is a full, clear, and exact description.

This invention is an improvement in means for preparing subaqueous foundations for tunnels, dock walls and piers, and for excavating the sites therefor, and is designed with special reference to a saving in the amount of labor and expense involved in such work.

Heretofore it has been usual to construct a tunnel and build it in a trench excavated in the bed of a body of water, and in such cases an air and water tight chamber was first constructed in the trench, the water then pumped out of it, and the tunnel proper or a section of the same was then built in the chamber, upon piles driven in the trench to form a foundation.

In other instances working chambers were built over a trench dredged to its full depth, which required it to be from one to six feet greater in depth and of greater width than was necessary for the finished structure to be laid therein and increased the total amount of excavation needed over fifty per cent. Long forms or molds of a working chamber consisting of steel cylinders for the inner mold, to which was attached an outer mold, were provided and these molds were then lowered into the trench, their ends resting on a grillage supported by four piles attached thereto, and driven simultaneously into the material in the bottom of the trench. Then concrete was deposited through the water about the molds with the result, by reason of the absence of a pile foundation under them, that the weight of the concrete caused the forms to settle irregularly from two to fifteen inches.

When the water within the inner mold or cylinder was pumped out, it formed a working chamber in which the tunnel proper was constructed; with the result that in places where the material in the bottom of the trench was soft when the tunnel proper was being built, the structure settled, which could have been obviated if piles had been driven uniformly to afford a foundation.

The result also was that the amount of concrete used was about three times that which would have been required for the structure if the tunnel were built at the surface of the water.

These and other methods of tunnel construction heretofore employed or proposed are open to numerous objections. They necessitate a working chamber for each length of tunnel, and require that the tunnel proper be built within a subaqueous working chamber, instead of being built complete at the surface of the water and then lowered into place. In addition no adequate provision was made for excavating a trench in rock.

Several patents have been granted for building tunnels at the surface of the water and lowering them into a trench dredged out from the bed of a river or other body of water, but none of these have disclosed a practical plan of preparing an adequate foundation for the support of the tunnel when it has been lowered into position. These are only some of the objections which obtain in the usual methods of subaqueous tunnel construction.

With a view to obviating these and other difficulties I have devised a plan for carrying on such work that presents many and distinct advantages. According to my present invention, I proceed as follows:

I build what may be termed a traveling submarine working chamber or dredge, that is to say a chamber or structure which is substantially of the dimensions of a section of the tunnel which is to be built, and which may, in fact, be eventually utilized as one of such sections after removing those working parts with which it is temporarily equipped for the purpose of excavating the trench and building the foundations for the tunnel. This structure is ordinarily, though not necessarily, of a length which is greater, though not excessively greater, than the total width of the completed tunnel and by the ordinary processes practised by engineers it is turned at right angles to the position which it would normally occupy, or in other words transversely to the line of the tunnel, and lowered to the bottom over that portion of the latter which it is necessary to excavate for the foundation for a tunnel section.

The bottom of this structure is open and constitutes a compartment in which the proper air pressure may be maintained to exclude the water and to permit workmen to carry on the necessary operations involved in excavation, and through the entire structure there may be provided suitable tubes or slots through which piles or sheeting may be driven from the surface, and in the compressed air chamber circular or other saws may be placed and adjustably mounted on fixed supports therein to cut off these piles or planks at the exact levels desired, and this without reference to the exact location of the piles with reference to the structure above it or whether said piles have been driven through the tubes in the structure or outside of it. Or in case of a rock bottom concrete columns or supports may be laid of the proper height so that in either case a firm foundation at any exact and predetermined grade for tunnels in sections of any length is very greatly facilitated.

By the use of the above described structure other important advantages may be secured. For example, the outside walls of the structure, particularly those toward the line of the projected trench, may be equipped with a suitable number of pivoted dredging pipes and means for adjusting the position of the same, controllable preferably within the compressed air chamber, which pipes communicate with suitable pumps within the air chamber, whereby mud, silt, or other soft material forming the bottom around or ahead of the structure may be removed by the pipes and raised to scows on the surface. In this way, provision being made for advancing the structure, the trench may be excavated around or under the chamber or extended ahead of the last tunnel section laid in place, preferably, by laying beams or rails on the sawed off piles and running trucks over these which support the structure and advance it as the material of the trench is removed.

These and other results which are secured by my invention tend to greatly reduce the cost of tunnel construction and very materially lessen the labor and difficulty experienced in such work. In addition to providing a cheap and ready means of laying tunnel sections lowered successively to their final position in the ordinary way, the invention affords a means for carrying out other and entirely new processes of constructing tunnels, as by building their sections up vertically under water and tipping them onto a substantially horizontal foundation, an invention which is not further described herein, as it will be made the subject of other applications.

Referring now to the drawings hereto annexed which illustrate the specific construction of the parts and appliances above more generally described—

Figure 1 is a sectional view of what I have above referred to as my submarine traveling chamber or dredge, a structure of the general character and dimensions of a section of the tunnel to be laid, and when desirable of somewhat greater length than width. In this figure the section is along the line of the greater dimension.

Fig. 2 is an ideal illustration of a section of tunnel ready for laying in a trench which is assumed to have been made under such section when turned at right angles to the position shown in this figure.

Fig. 3 is a sectional view of the same parts equipped with dredging or other appliances and means for driving piles through the structure.

Fig. 4 is a similar view of the same parts showing the means employed for advancing it along a previously excavated trench.

Fig. 5 is a somewhat enlarged view of the same structure illustrating other features of construction used in producing it.

Fig. 6 is a similar view of the same parts at right angles to the position shown in Fig. 5.

Fig. 7 is a plan view of the structure shown in Fig. 3 with parts cut away, and on a somewhat larger scale.

Fig. 8 is a perspective and part sectional view of the means employed for lowering tunnel sections onto the foundations prepared by the devices of the previous figures.

Fig. 9 is a sectional view on an enlarged scale of the construction of the bottom of the structures of Figs. 1 and 2.

Fig. 10 is a plan and part sectional view of the same parts.

Fig. 11 is a sectional view of a double tunnel section.

Fig. 12 is a sectional detail of a means for rendering water tight the joints of the sheathing surrounding the tunnel.

Fig. 13 is a plan view of a modification of the provision for driving piles or sheeting through the structure.

Fig. 14 is a detailed illustration of an attachment to the dredging appliances.

So far as is practicable for purposes of illustration, I have used the same numerals to indicate corresponding parts throughout the several figures of the drawings.

The general construction of the tunnel section or submarine dredge is shown in Figs. 1 and 2. This consists of a boxlike structure or chamber 1, usually several feet greater in length than in width, provided at the bottom with an open chamber 2, at the sides with removable bulkheads 3, and built in any proper and substantial manner with I-beams 4 at top and bottom and beams 5 to support the partition 6 between the two, or the lower and upper compartments. A tube 7 provided with the usual air locks passes down through the structure vertically from the surface and opens into the lower compressed air compartment 2.

This tube is not continuous but has a joint near the dredge formed by flanges 47, secured together by bolts or other means which may be quickly and easily removed by a diver in order that the upper part of the tube may be removed and the chamber allowed to fill with water should such necessity arise.

More specifically illustrated this structure, as shown in Figs. 5 and 6 has angle irons 8 at the top and bottom of the I-beams along its sides, and to these beams are secured planking or sheathing 9 which constitutes the exterior surface of the structure and which must be perfectly watertight. In order to effect this result the planks 9, see Fig. 12, are tongued and grooved, the tongue being somewhat less in length than the depth of the groove, so that a space is formed at each joint. Into this space one or more small holes 10 are bored at convenient points, when the joint is not exposed to the top, so that a sealing material such as pitch or the like may be run in through the hole, filling the space with a water-tight seal 11 and making a perfectly tight joint.

Extending down through the structure at proper points are a series of tubes 12 to receive piles 13, Figs. 3 and 11, which may be introduced through them and driven into the mud or soft bottom from the surface. For purposes which will hereinafter more fully appear, these tubes 12 where they enter the compressed air compartment 2, have joints 14, by means of which their lower ends may be removed, and valves 15 are provided at or near such joints which may be closed when the lower ends of the tubes are detached.

As a further illustration of the appliances used with the structure 1, reference is made to Figs. 3, 4 and 7. Upon the lower cross beams 4, suitable platforms are provided upon which is mounted a pump or pumps 16 which draw down the requisite free air from the surface through pipes 17, and a pump or pumps 18 connected to a pipe 19, running up to the surface or other convenient point, where it is suitably bent over to discharge into a scow 20. From the pump 18 leads a horizontal pipe 21 which is connected with a cross pipe 22 having branches 23 extending out through the forward side walls of the chamber 2 or preferably, through both forward and rear walls or if desired through all of the walls. These branch pipes carry dredging pipes 24 pivotally connected to their ends. It will be understood that there may be as many pumps 18 as are necessary and any suitable number or arrangement of cross pipes 22 and also that the number of branch and dredging pipes connected with the pumps may be varied according to need, to dredge under, or on all sides of the chamber. The character of the dredging pipes 24 may also be modified and their length and number fixed according to circumstances, as conditions of practice may dictate.

The position of the pivoted dredging pipes 24, which are not accessible from within the chamber, may be controlled by any suitable means. For this purpose I have shown these pipes supported by ropes 25 running over pulleys 26 and carried through comparatively tight openings in the walls of chamber 2, within which they are wound upon reels 27. Any suitable means other than this may be employed to adjust the position of the pipes 24 from within the chamber 2 or otherwise.

The bottom dredging pipes 24 particularly at the rear of the structure which serve to clean the floor space of the trench may be constructed as shown in Figs. 7 and 14. The end of the pipe, in this case, is composed of a flexible portion 28 connected to a horizontal pipe 29 having a slot along its under side. This horizontal end piece is supported by a hinged frame 30 secured to the outside wall of the chamber 2 and its height above the bottom is controlled by curved guides or runners 31, which rest upon the bottom. By means of this device the mud is drawn off from the bottom in a layer and a substantially flat surface is formed which conforms to the required level of the floor of the trench.

In the compartment 2 is also a motor 32 which is removably supported on the beams 4 and which drives by suitable bevel gearing a vertical shaft carrying a circular saw 33. Any other suitable device may be employed to perform the functions of this saw, the purpose of which is to cut off at any level to which the saw may be adjusted, the beams 13 so that they will constitute a solid foundation for a tunnel section at exactly the proper and required level.

When the structure is used for submarine dredging by the operation of the devices above described, it is desirable that it should be movable along a predetermined level, and for this purpose I lay beams 34 along the tops of the sawed off piles and run trucks 35 upon these beams. The cross beams 4 rest upon the axles of these trucks, and the whole structure is thus supported upon the trucks. Any means such as blocks or tackles 37 controlled either from within or without the chamber 2, may be employed to advance the structure as occasion may require, or it may be drawn back by a tackle 38.

The structure may be raised or lowered with respect to these trucks by jacks placed between the trucks and beams 36 secured to the upper side of beam 4, thus providing for an elevation of the structure over obstacles encountered by it.

It may sometimes be desired to drive planks into the mud to form a sheeting instead of piles, and for this purpose I use elongated tubes or slots through the structure such as shown at 39 in Fig. 13 which will permit three or more planks to be driven in line instead of isolated piles through the holes or tubes previously described.

When by the use of the above described means a trench and foundation has been prepared, sections of tunnel of the desired length are lowered to the bottom by the means shown in Fig. 8 or any proper equivalent therefor. In such cases a proper length of foundation having been prepared, foot pieces 40 are secured to opposite pairs of piles at the proper distance apart and to these pieces are pivoted beams 41. The beams of each pair, with proper regard to other conditions, are separated by approximately the width of the tunnel to be laid and they are brought up to a substantially vertical position when needed, and a section of tunnel is floated in between them. Scows 42 are then brought alongside the tunnel section and made fast on opposite sides of the same and weights lowered upon the section to sink it.

As the buoyancy of the tunnel section is very considerable, I partially complete the bottom by filling in between alternate beams 4 with concrete, as shown at 44 in Figs. 9 and 10, but as it is desirable and, in fact, practically essential that in sinking the section its buoyancy should be under complete control, I provide passages 45 in or under the flooring or sheathing which communicate with the unfilled spaces between the beams 4. I then admit through the passages 45, a sufficient amount of water to overcome the buoyancy of the tunnel section and sink it easily and properly into its final resting place on the foundation piles. When in position the tunnel is complete by filling in all the spaces between the I-beams with concrete and uniting it to the previously laid section in any known manner.

The tunnel sections may be of any desired form or capacity. In Fig. 11, I have shown a double tunnel which may be constructed and laid in accordance with the plan above outlined. In this case the greater width of the tunnel involves simply the use of a dredging section of greater length in order to prepare a trench that will be wide enough to receive the wider tunnel sections.

As above explained the device to which I have given the name of a submarine traveling chamber or dredge, may itself be utilized at any time as one of the sections of the tunnel proper, as its construction differs in no respect from any of the other and regular sections, except with regard to the appliances with which it is equipped or other features which may be readily altered or removed when occasion requires.

When the bottom is rock, as shown in Fig. 2, the proceeding followed in preparing the foundation and laying the tunnel is the same as that described with reference to driven piles except that bases or columns of concrete 46 are laid upon the rock bottom and are given the required height to form a proper foundation.

Although I have illustrated herein only tunnels of approximately rectangular cross section, it will be understood that the means employed for preparing the foundations may be used for building tunnels of any shape, round, oval or otherwise or for laying other analogous structures, as the proper height of the piles or supports may be determined without difficulty, and the form of the trench may be anything desired. In the case of piles the levels at which they are sawed off is obviously determined solely by the adjustment of the saw with reference to the lower beams of the dredging section.

My improved device lends itself to other useful purposes than the laying of tunnels. For example, in building dock walls and piers the necessary excavation may be made and the piles driven and cut off at the proper heights to form a foundation for the mass of concrete forming the dock or pier. As in cases where pile docks are to be constructed with concrete, and where it is now necessary to draw the piles and build foundations, I may by using suitable saws, cut off the driven piles alongside the dredge, to any level, dredge around them, drive any number of other piles, and build the walls upon them.

Without limiting myself therefore in any of these or other respects, what I claim is:—

1. A means for preparing foundations for tunnel sections which comprises an air and water-tight open bottomed structure of slightly greater length than width and of the dimensions of a tunnel section, a horizontal and removable partition therein which forms a chamber beneath it for compressed air, and ballast tanks above it, and means for permitting access to the compressed air chamber, whereby a trench may be prepared under the structure when lowered to the bottom with its longer axis, transverse to the line of tunnel, of greater width than the tunnel to be laid therein.

2. An apparatus for preparing foundations for subaqueous tunnels comprising a chamber or structure with air-tight and water-tight top, sides and ends, and an open bottom, a horizontal temporary or removable water-tight partition wall forming a compressed air chamber below and ballast tanks above it, in combination with means for lowering and raising the structure to and from the water bed for preparing a trench and foundation for tunnel sections.

3. A closed chamber having an open compressed air compartment at the bottom and tubes or slots extending through the structure whereby a trench may be excavated under the structure when lowered to the bottom and piles or planking driven into the mud through said tubes or slots and cut off at the desired height to form the foundation for the completed tunnel sections when laid thereon.

4. A structure for building foundations for subaqueous tunnels consisting of a closed chamber adapted to be sunk to the bottom and having in its lower portion an open bottomed compressed air chamber for excavating a trench under the structure, tubes or slots through the structure through which piles or planking may be driven from above into the mud and a saw adapted for attachment to fixed beams or supports within the compressed air chamber for cutting off the said piles at the proper levels for forming a foundation for the tunnel.

5. A structure for building foundations for subaqueous tunnels, consisting of a chamber with air and water-tight top, sides and ends, a horizontal water-tight partition dividing the chamber with an open bottomed compressed air chamber below and ballast tanks above and air lock tubes for affording access to said chamber, in combination with dredge pipes normally connected to the outside walls of the structure, and a pump in the compressed air chamber by means of which mud taken up by the dredge pipes may be raised to a scow at the surface.

6. A structure for building foundations for subaqueous tunnels, consisting in a closed chamber adapted to be sunk to the bottom and having at its lower part a compressed air compartment open to the mud, tubes or slots through the structure for driving piles or planks into the mud from the surface, means for cutting off said piles at the desired levels for the foundation and trucks adapted to support the structure on beams laid on said piles whereby the structure may be advanced for progressively preparing a foundation for the finished tunnel.

7. A structure for building the foundation for subaqueous tunnels consisting in a closed chamber adapted to be sunk to the bottom, a compressed air compartment at the bottom of the structure open to the mud, tubes passing through the entire structure through which piles may be driven from the surface, the lower parts of said tubes within the compressed air compartment being detachable from the main portion and valves for closing the ends of the tubes when the lower parts are detached.

8. The means herein described for controlling the buoyancy of subaqueous tunnel sections, consisting in supporting walls containing I-beams, the spaces between some of which are filled with concrete, and passages in or under the sheathing for introducing water to the empty spaces.

9. A structure for progressively excavating a trench under water consisting in a closed chamber adapted to be sunk to the bottom, dredging pipes operating to remove the mud around the chamber, a transverse slotted dredging pipe at the rear of the chamber for smoothing the bottom of the trench and a pump within the chamber connected with all of said dredging pipes.

10. A structure for progressively excavating a trench under water provided with passages through the same through which piles to form a tunnel foundation may be driven, means located in the structure for cutting off said piles at the desired level, in combination with tracks laid upon said piles, trucks thereon supporting the structure and means for raising the structure to a greater or less extent upon such trucks.

In testimony whereof I affix my signature.

DUNCAN D. McBEAN.

Copies of this patent may be obtained for five cents each, by addressing the "Commissioner of Patents, Washington, D. C."